(12) United States Patent
Tokoro et al.

(10) Patent No.: US 8,265,121 B2
(45) Date of Patent: Sep. 11, 2012

(54) RECEIVER

(75) Inventors: Kenichi Tokoro, Kanagawa-ken (JP); Takashi Seki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 456 days.

(21) Appl. No.: 12/633,403

(22) Filed: Dec. 8, 2009

(65) Prior Publication Data

US 2010/0202568 A1   Aug. 12, 2010

(30) Foreign Application Priority Data

Dec. 9, 2008   (JP) .................. 2008-313498

(51) Int. Cl.
*H04B 1/00* (2006.01)

(52) U.S. Cl. ........ 375/142; 347/147; 347/316; 347/326; 347/340

(58) Field of Classification Search .................. 375/142, 375/326, 340, 147, 316

See application file for complete search history.

(56) References Cited

U.S. PATENT DOCUMENTS

2003/0129999 A1 * 7/2003 Ikeda et al. .................. 455/502
2007/0217356 A1 * 9/2007 Kanno et al. .................. 370/328
2009/0274447 A1 * 11/2009 Morinaga et al. ............. 386/124

FOREIGN PATENT DOCUMENTS

JP   2003-273824   9/2003

* cited by examiner

*Primary Examiner* — Ted Wang
(74) *Attorney, Agent, or Firm* — Turocy & Watson, LLP

(57) ABSTRACT

Provided is a receiver including a receiving unit, a demodulator-decoder unit, a synchronization detecting unit, and an output control unit. The receiving unit receives digital broadcasting. The demodulator-decoder unit obtains an output including a transport stream through a demodulating processing and a decoding processing performed on a reception signal received by the receiving unit. The synchronization detecting unit secures synchronization on the basis of the reception signal received by the receiving unit, and generates a timing signal to be used in the demodulating processing and in the decoding processing. The output control unit outputs the output including the transport stream from the demodulator-decoder unit if the synchronization is secured. The output control unit fixes a logic level of the output including the transport stream if the synchronization is not secured.

16 Claims, 6 Drawing Sheets

11 OFDM TRANSMISSION RECEIVER
13 TUNER
14 A/D CONVERTER
15 RECEIVING UNIT
16 ORTHOGONAL DETECTOR UNIT
17 FFT UNIT
18 DEMODULATOR UNIT
19 DECODER UNIT
20 TS OUTPUT CONTROL UNIT
21 SYNCHRONIZATION DETECTING UNIT
22 GUARD-INTERVAL CORRELATION DETECTING UNIT
23 FRAME SYNCHRONIZATION DETECTING UNIT

RECEIVER

CROSS REFERENCE TO RELATED APPLICATIONS

This application is based on and claims the benefit of priority from prior Japanese Patent Application No. 2008-313498, filed on Dec. 9, 2008, the entire contents of which are incorporated herein by reference.

BACKGROUND OF THE INVENTION

1. Field of the Invention

The invention relates to a receiver, and particularly to a receiver suitable for the OFDM system employed in a mobile communications system, a wireless LAN system, and the like.

2. Description of the Related Art

In recent years, digital television broadcasting has been started. In Europe and Japan, the orthogonal frequency division multiplexing (OFDM) modulation system is employed as the transmission system of the terrestrial television broadcasting system. In the OFDM system, wideband signals are transmitted by use of multiple subcarriers that are orthogonal to one another. For this reason, the OFDM system is advantageous in that the OFDM system has, as one of essential transmission conditions for the terrestrial television broadcasting, an ability to improve delay interference characteristics in the multipath propagation paths.

The digital broadcasting in Japan employs the ISDB-T standard. According to the ISDB-T standard, a transport stream (TS) specified in the standard of Moving Picture Experts Group (MPEG) undergoes various signal processings such as error-correcting coding, interleave coding, and digital modulation. The resultant signals are OFDM modulated, and are then outputted.

According to the ISDB-T standard, a single block includes OFDM symbols of 108 carriers in the frequency domain. A single segment includes a single block, two blocks, or four blocks, depending on the mode. Accordingly, the number of carriers for each single segment is 108, 216, or 432. According to the ISDB-T standard, the transmission of signals is performed using a bandwidth for 13 segments.

In addition, according to the ISDB-T standard, a single frame includes 204 OFDM symbols in the time domain. The TS-transmission and the energy spread processing are performed frame by frame.

In addition, the ISDB-T standard can provide a hierarchical transmission, in which plural layers of different transmission characteristics are transmitted simultaneously. Each layer includes one or plural OFDM segments. Parameters, such as the carrier modulation system, the coding ratio of inner coding, and the time interleave length, can be specified for each layer.

In digital broadcasting receivers, TSs are extracted from the broadcasting signals of a channel selected by the tuner, through processing on the broadcasting signals by various processing units including an orthogonal detector unit, a FFT unit, a demodulator unit, and a decoder unit. For example, Japanese Patent Application Publication No. 2003-273824 proposes an apparatus which supplies TSs from a decoder unit to a TS decoder by selectively outputting TSs of a layer that is determined as providing effective output. This selective TS-output allows the reduction in power consumption as well as saves a space of the recording area in the recording medium when the broadcasting is recorded in a subsequent stage.

The OFDM receiving demodulator unit including the orthogonal detector unit, the FFT unit, the demodulator unit, and the decoder unit is often formed in an LSI circuit. In addition, the OFDM receiving demodulator unit and the tuner are included together in an LSI circuit in some cases nowadays.

In general, the internal voltages of LSI circuits tend to become lower to reduce the power consumption. Nonetheless, the voltage of the TS-output pin is usually set at a higher voltage than the internal voltage so that the TS-output pin maintains the interfaces with other LSI circuits. Accordingly, the amplification factor at the TS-output portion in the OFDM receiving demodulator unit is so large that spurious (high-frequency noise) emissions are more likely to occur. In addition, the technical progress achieved in the LSI circuit development process has made the chip size smaller. In a smaller-sized chip, the distance between each adjacent pins of the LSI circuit is narrower, and so is the distance between the tuner input pin and the TS-output pin.

For this reason, spurious emissions from the TS-output pin are likely to be inputted into the tuner input pin. The input of the spurious emissions causes no problems when the broadcasting signals are received. The input, however, causes a problem while no signal is received because synchronous detections are performed for the spurious-components mixed in through the tuner input pin, and thus synchronization is secured in the OFDM receiving demodulator unit. Upon securing the synchronization, the OFDM receiving demodulator unit sometimes starts operating other portions inside. The erroneous operations result in wasteful consumption of power. In addition, securing synchronization has another problem that circuits disposed at stages subsequent to the OFDM receiving demodulator unit, such as a decoder, may operate erroneously as well, so that power is wastefully consumed.

SUMMARY OF THE INVENTION

The receiving device according to an aspect of the present invention includes a receiving unit, a demodulator-decoder unit, a synchronization detecting unit, and an output control unit. The receiving unit receives digital broadcasting. The demodulator-decoder unit obtains an output including a transport stream through a demodulating processing and a decoding processing performed on a reception signal received by the receiving unit. The synchronization detecting unit secures synchronization on the basis of the reception signal received by the receiving unit, and generates timing signal to be used in the demodulating processing and in the decoding processing. The output control unit outputs the output including the transport stream from the demodulator-decoder unit if the synchronization is secured. The output control unit fixes a logic level of the output including the transport stream if the synchronization is not secured.

DETAILED DESCRIPTION OF THE EMBODIMENTS

Figure 1:
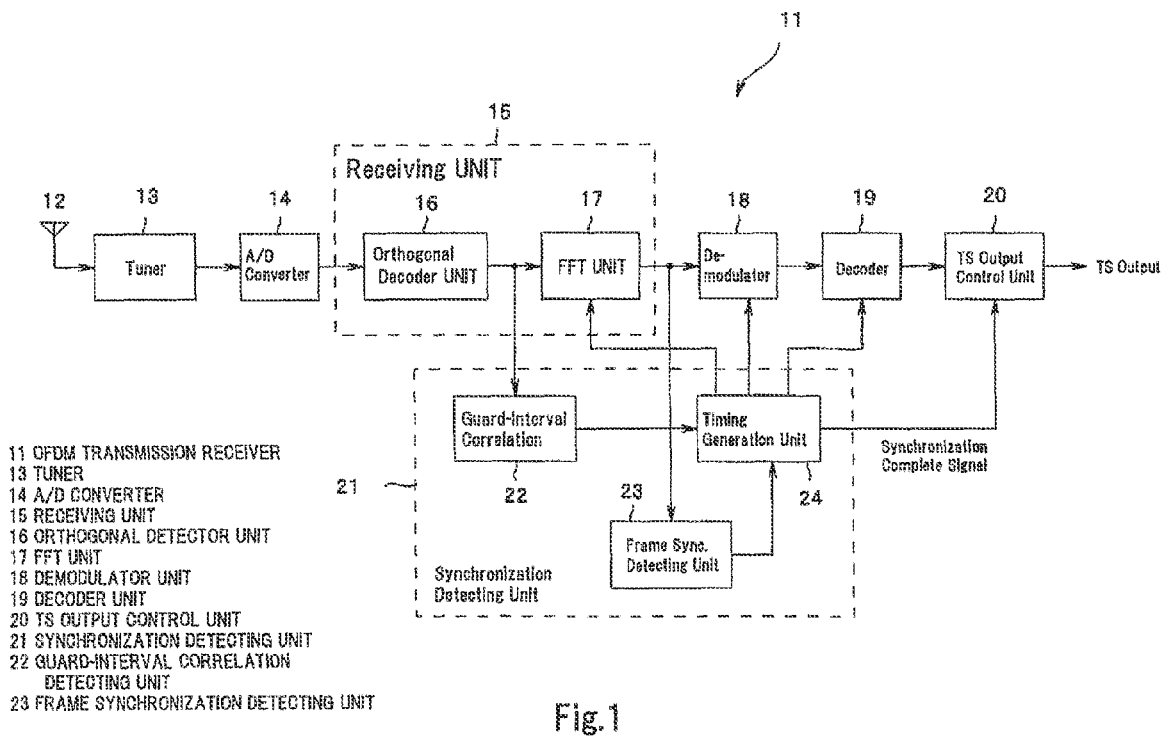
FIG. 1 is a block diagram illustrating a receiver according to a first embodiment of the invention.

Subsequently, receivers according to some embodiments of the invention will be described by referring to the drawings.

First Embodiment

FIG. 1 is a block diagram illustrating a receiver according to a first embodiment of the invention. The first embodiment is based on an assumption that the receiver is used in the digital broadcasting system of Japan.

In FIG. 1, digital-broadcasting high-frequency signals (OFDM signals) excited in an antenna 12 of a receiver 11 is supplied to a tuner 13. The tuner 13 selects a desired channel from the OFDM signals, and outputs the OFDM signals of the selected channel to an A/D converter 14. The A/D converter 14 converts the inputted, analog OFDM signals into digital signals, and then supplies the digital signals to a receiving unit 15.

The receiving unit 15 includes an orthogonal detector unit 16 and an FFT unit 17. The orthogonal detector unit 16 performs an orthogonal detection on the inputted OFDM signals, and thus obtains base-band OFDM signals. The OFDM signals thus obtained are supplied to the FFT unit 17, as well as to a guard-interval correlation detecting unit 22 of a synchronization detecting unit 21.

The FFT unit 17 is controlled by a timing generating unit 24, which will be described in detail later, and thus removes guard intervals from the base-band OFDM signals. In addition, under the control of the timing generating unit 24, the FFT unit 17 performs an FFT (fast Fourier transform) processing, and thus converts the OFDM signals of the time domain into OFDM symbols of the frequency domain. The OFDM symbols thus obtained by the FFT unit 17 are symbol-data strings representing the phases and the amplitudes of the carriers, and are supplied to a demodulator unit 18.

The demodulator unit 18 extracts transmission-mode signals from the inputted OFDM signals by a publicly-known method. The demodulator unit 18 identifies the mode information contained in the transmission-mode signals, and performs a synchronous detection or a delay detection in accordance with the identification result. Specifically, if the transmission mode is the synchronous detection, the demodulator unit 18 detects the differences among the carriers by use of the pilot signals inserted in the signals, and performs an amplitude equalization and a phase equalization. In addition, if the transmission mode is the delay detection, the demodulator unit 18 detects the differences among carriers from the adjacent symbols, and performs an amplitude equalization and a phase equalization. Thus, the demodulator unit 18 acquires data and layer information of equalized OFDM signals. The equalized OFDM signals are supplied to a decoder unit 19.

The decoder unit 19 performs an error-correcting processing using error-correcting codes such as inner codes and outer codes added by the sending party, and thus restores the original signals transmitted by use of the OFDM signals. The output from the decoder unit 19 includes TS packets (TSPs) of MPEG2. The output including TSPs from the decoder unit 19 is provided to a TS-output control unit 20. The TS-output control unit 20 outputs the received output including TSPs as a TS-output.

The FFT unit 17, the demodulator unit 18, the decoder unit 19, and the TS-output control unit 20 are controlled by timing signals from the synchronization detecting unit 21. The synchronization detecting unit 21 secures symbol synchronization and frame synchronization on the basis of the OFDM signals obtained by the orthogonal detection and the OFDM symbols from the FFT unit 17.

Figure 2:
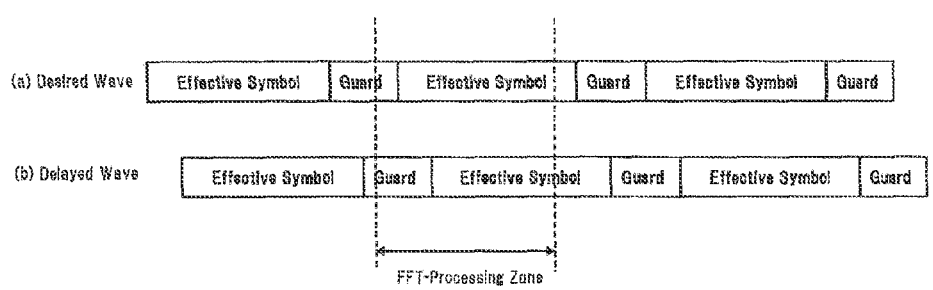
FIG. 2 is a diagram for describing an OFDM symbol.

FIGS. 2A and 2B are diagrams for describing OFDM symbols. FIG. 2A illustrates a desired wave, and FIG. 2B illustrates a delay wave. As FIGS. 2A and 2B show, each single symbol period of the OFDM signals includes a guard period and an effective symbol period. The guard period is provided to eliminate the influence exerted by the delay wave caused by the multi-paths. The same signals that are assigned to the trailing portions of the effective symbol period are assigned to the guard period. Accordingly, even when a portion of the effective symbol period is subjected to the inter-symbol interference caused by the influence of the multi-paths, the data stored in the effective symbol period can be extracted by shifting the FFT-processing zone (FFT window) as long as the delay time is within the guard period. In the example shown in FIG. 2, the delay time of the delay wave for the desired wave is within the guard period. Accordingly, this example shows that the OFDM symbols can be extracted without being affected by the influence of the multi-paths by setting the FFT-processing zone (FFT window) equivalent to the effective symbol length at a position where no inter-symbol interference occurs.

For the purpose of setting the FFT window, the output of the orthogonal detector unit 16 is supplied also to the guard-interval correlation detecting unit 22. The guard-interval correlation detecting unit 22 delays the inputted OFDM signals by an amount equivalent to the effective symbol period, and compares the OFDM signals before and after the delay. The guard-interval correlation detecting unit 22 detects the correlation peak of the guard period through the comparison of the OFDM signals before and after the delay, thus acquires the symbol start timing, and then outputs symbol synchronizing signals to the timing generating unit 24.

The timing generating unit 24 generates timing signals for starting the FFT window (hereafter, referred to as the FFT-window signals) on the basis of the symbol synchronizing signals. The FFT-window signals are supplied from the timing generating unit 24 to the FFT unit 17, and thus the FFT-processing zone is determined.

The OFDM symbols acquired by the FFT unit 17 through the FFT processing are supplied also to a frame-synchronization detecting unit 23. The frame-synchronization detecting unit 23 detects the TMCC inserted in each OFDM frame.

Figure 3:
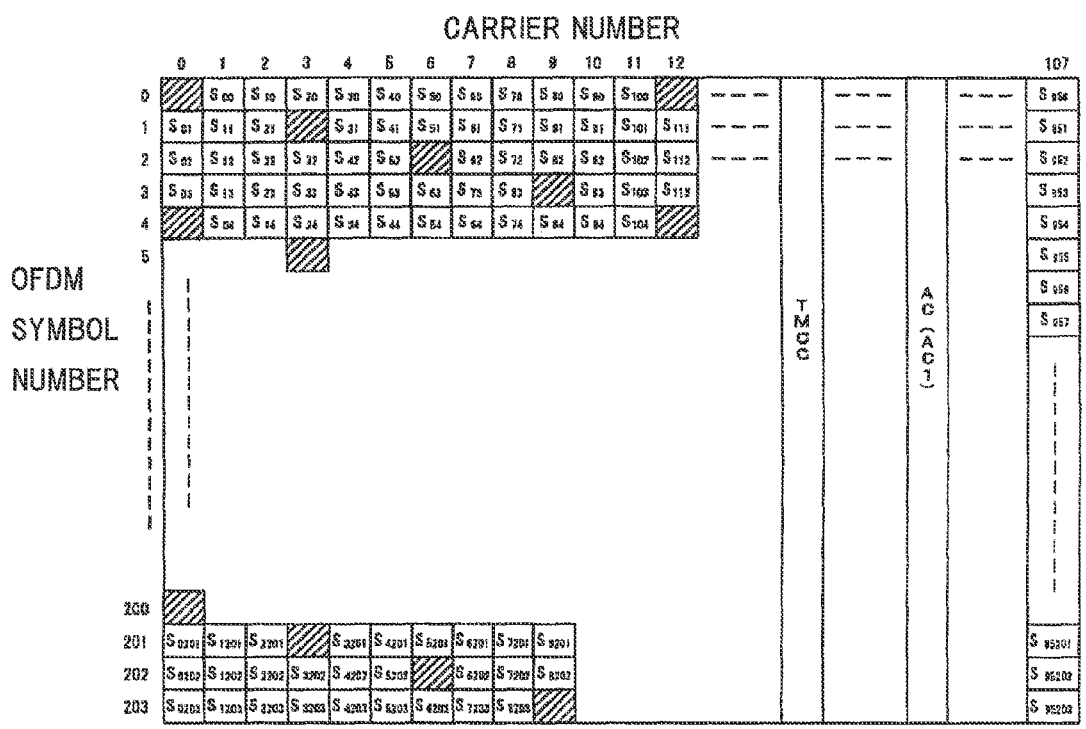
FIG. 3 is a chart for describing the configuration of an OFDM frame with the horizontal axis representing the carrier number (frequency domain) and the vertical axis representing the symbol number (time domain).

FIG. 3 is a diagram for describing the configuration of an OFDM frame with the horizontal axis being the carrier number (frequency domain) and the vertical axis being the symbol number (time domain). The chart shown in FIG. 3 is cited from STD-B31 "terrestrial digital television broadcasting transmission system" of ARIB standards. The example shown in FIG. 3 employs the QAM modulation as the modulation system. As FIG. 3 shows, a carrier in each single frame is used for the transmission of the TMCC. Note that the diagonally shaded cells indicate SP (scattered pilot) symbols.

Each TMCC is inserted in every block of the symbols, and transmits the information on the layers and the frame-synchronizing signals. A single carrier in each block is assigned to the TMCC, and thus a single symbol includes TMCC information of one bit which is BPSK modulated. Accordingly, TMCC information of 204 bits for each single frame is transmitted in each block. Of the 204-bit TMCC information in the OFDM frame, 16 bits are assigned to the synchronous signals. Detecting the synchronous signals, the receiver secures frame synchronization.

Table 1 illustrates the configuration of the 204-bit TMCCs (B0 to B204) in the OFDM frame.

TABLE 1

| | |
|---|---|
| B0 | Reference for Differential Demodulation |
| B1 to B16 | Synchronizing signal (w0 = 0011010111101110, w1 = 1100101000010001) |
| B17 to B19 | Segment Type Identification |
| B20 to B121 | TMCC information |
| B122 to B203 | Parity Bit |

As Table 1 shows, 16 bits (B1 to B16) within each frame are assigned to synchronizing signals. The frame-synchronization detecting unit 23 detects, from the bits of TMCC in the OFDM frame, the same pattern as the pattern defined by the B1 to B16 in Table 1, as the synchronizing signal. The frame-synchronization detecting unit 23 outputs the detection result of the frame synchronizing signals to the timing generating unit 24. On the basis of the detection result of the frame synchronizing signals, the timing generating unit 24 generates and outputs the timing signals that will be used in the demodulation processing performed by the demodulator unit 18 and in the decoding processing performed by the decoder unit 19.

Symbol synchronization is secured by the detection of the symbol synchronizing signals by the guard-interval correlation detecting unit 22 whereas the frame synchronization is secured by the detection of the frame synchronizing signals by the frame-synchronization detecting unit 23. In the first embodiment, once the symbol synchronization and the frame synchronization have been secured, the timing generating unit 24 outputs a synchronization complete signal to the TS-output control unit 20. Note that the synchronization complete signal is at a high level (hereafter, referred to as "H-level") if synchronization is secured, and the synchronization complete signal is at a low level (hereafter, referred to as "L-level") if synchronization is not secured.

If the synchronization complete signal indicates that synchronization has been secured, the TS-output control unit 20 outputs the output of the decoder unit 19 as the TS-output. If the synchronization complete signal indicates that synchronization has not been secured yet, the TS-output control unit 20 fixes the logic value of the output from the decoder unit 19 to the subsequent stages. For example, if the synchronization complete signal indicates that synchronization has been lost, the TS-output control unit 20 makes the TS-output that has been at the H-level maintain at the H-level, and makes the TS-output that has been at the L-level maintain at the L-level.

Figure 4:
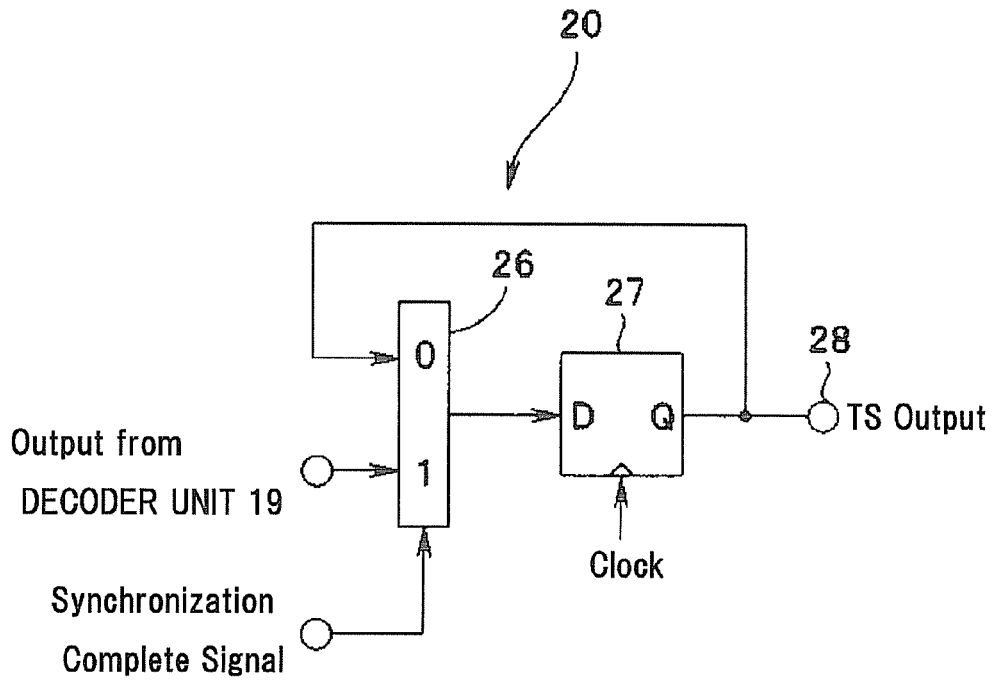
FIG. 4 is a block diagram illustrating a specific, exemplar configuration of a TS-output control unit 20 shown in FIG. 1.

FIG. 4 is a block diagram illustrating a specific, exemplar configuration of the TS-output control unit 20 shown in FIG. 1. As will be described later, there are three different kinds of TS-outputs, which are TS serial data; TS serial clock, and TS valid data. So, the TS-output control unit 20 has to provide three circuits one of which is shown in FIG. 4.

TS-output control unit 20 includes a selector 26 and a flip-flop 27. The two input terminals of the selector 26 are supplied with the output of the decoder unit 19 and the output of the flip-flop 27, respectively. If the synchronization complete signal supplied to the control terminal is at the H-level, the selector 26 selects the output of the decoder unit 19. If the synchronization complete signal supplied to the control terminal is at the L-level, the selector 26 selects the output of flip-flop 27. The selector 26 outputs the selected output to the flip-flop 27. The flip-flop 27 outputs the input of the data end D through an output end Q at clock timings. The output of the flip-flop 27 is then outputted as the TS-output from an output terminal 28.

With this configuration, if the synchronization complete signal is at the H-level, the output of the decoder unit 19 is directly outputted as the TS-output through the output terminal 28. Conversely, if the synchronization complete signal is at the L-level, the logic value of the TS-output at the timing when the synchronization complete signal is shifted from the H-level to the L-level is kept and is then outputted from the output terminal 28.

Figure 5:
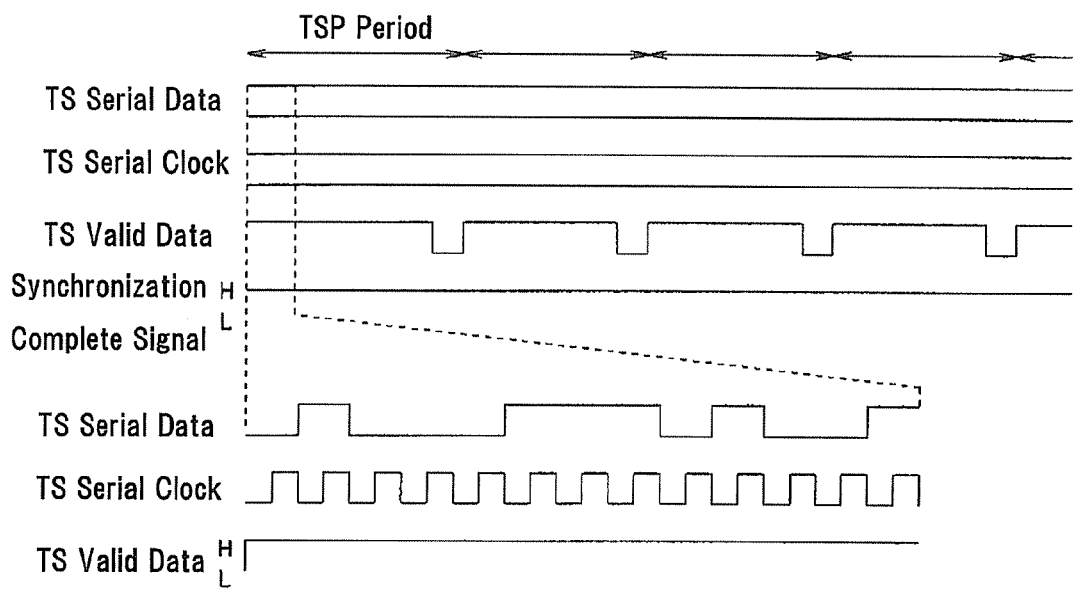
FIG. 5 is a timing chart for describing the operation of the first embodiment of the invention.
Figure 6:
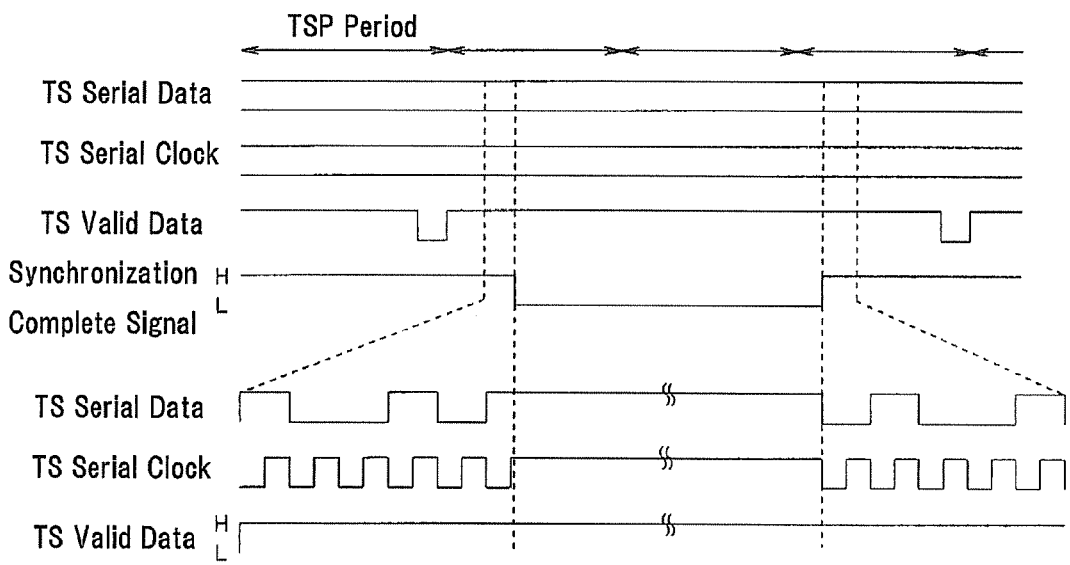
FIG. 6 is a timing chart for describing the operation of the first embodiment of the invention.

Subsequently, the operation of the first embodiment with the above-described configuration will be described by referring to FIGS. 5 and 6. FIGS. 5 and 6 are timing charts for describing the operation of the first embodiment. FIG. 5 shows the operation of the case where synchronization has been secured, whereas FIG. 6 shows the operation of the case where synchronization that had been secured once has been lost. FIGS. 5 and 6 show the TS serial data, the TS serial clock, and the TS valid data all of which are included in the TS-output, and show the synchronization complete signal as well. In addition, of all the charts in each of FIGS. 5 and 6, those three charts from the bottom are charts depicted by enlarging parts of their corresponding charts shown above in the time direction.

The TS serial data are serial data of the transport stream. TS serial clock is a clock corresponding to the TS serial data. The TS valid data are signals indicating the start of the TSPs.

The high-frequency signals excited in the antenna 12 is provided to the tuner 13, and the tuner 13 selects the channel. The output of the tuner 13 is converted into digital signals by the A/D converter 14, and the resultant digital signals are supplied to the orthogonal detector unit 16 of the receiving unit 15. The orthogonal detector unit 16 performs an orthogonal detection, and thus acquires base-band OFDM signals.

The OFDM signals are provided to the guard-interval correlation detecting unit 22, where the correlation peaks of the guard periods are detected. Thus, the guard-interval correlation detecting unit 22 detects the symbol synchronizing signals, and outputs the detected symbol synchronizing signals to the timing generating unit 24. The timing generating unit 24 sets, in the FFT unit 17, the FFT window based on the detection result of the guard-interval correlation detecting unit 22.

In accordance with the FFT window, the FFT unit 17 removes guard intervals from the base-band OFDM signals obtained through the orthogonal detection. In addition, the FFT unit 17 performs the FFT (fast Fourier Transformation) Processing, and thus converts the OFDM signals of the time domain into the OFDM symbols of the frequency domain. The OFDM symbols from the FFT unit 17 are supplied to the demodulator unit 18 and to the frame-synchronization detecting unit 23 as well.

The frame-synchronization detecting unit 23 extracts the TMCCs included in the OFDM symbols, and then detects the pattern of the synchronizing signals in the TMCCs. Once the frame-synchronization detecting unit 23 has detected the pattern of the synchronizing signals, the frame-synchronization detecting unit 23 outputs the frame synchronizing signals to the timing generating unit 24.

Once the symbol synchronization and the frame synchronization have been secured, the timing generating unit 24 generates timing signals to control the operations of the demodulator unit 18 and the decoder unit 19. Upon receipt of the timing signals, the demodulator unit 18 starts the demodulation processing on the OFDM symbols from the FFT unit 17 while the decoder unit 19 starts the decoding processing on the output of the demodulator unit 18. In other words, the demodulator unit 18 restores the original data before the modulation from the inputted OFDM symbols. The decoder unit 19 restores the original data through the error-correcting processing. The output of the decoder unit 19 is supplied to the TS-output control unit 20.

The output of the decoder unit 19 includes the TS serial data, the TS serial clock, and the TS valid data shown in FIG. 5. The head of the TSP is indicated by the shifting of the TS valid data from the L-level to the H-level, as FIG. 5 shows. While the synchronization complete signal is at the H-level, TS-output control unit 20 outputs the TS serial data so that the TS serial data synchronize with the TS serial clock.

Now, suppose a case of losing either symbol synchronization or frame synchronization. For example, synchronization may be lost when digital broadcasting signals are not received or when the signal receiving level drops down significantly. Such drop of signal receiving level may occur when signals are received by a moving body which is in a tunnel, for example. In these cases, the timing generating unit 24 detects the loss of synchronization on the basis of the output from the guard-interval correlation detecting unit 22 and the output of the frame-synchronization detecting unit 23. Then, as FIG. 6 shows, the timing generating unit 24 shifts the level of the synchronization complete signal from the H-level to the L-level.

Then, the TS-output control unit 20 outputs an output in which the logic level of the output of the decoder unit 19 at the timing of shifting the level of the synchronization complete signal from the H-level to the L-level is held as it is. As FIG. 6 shows, at the timing when the level of the synchronization complete signal is shifted from the H-level to the L-level, the TS serial data are at the H-level, the TS serial clock is at the H-level, and the TS valid data are at the H-level. Accordingly, the TS-output control unit 20 keeps the TS serial data, the TS serial clock, and the TS valid data at the H-level.

Accordingly, even if the reception level of the antenna 12 is extremely low, the fixing of the logic level of the output of the TS-output control unit 20 makes the spurious components small enough. For this reason, even in this case, no such events can occur that the timing generating unit 24 is made to secure synchronization by the output of the receiving unit 15. Accordingly, until the reception level rises up to a sufficient level again, the level of the synchronization complete signal is kept at the L-level, and the logic level of the output of the TS-output control unit 20 is held as it is. Consequently, the occurrence of the spurious can be reduced.

Since no synchronization has been secured yet, the demodulator unit 18 and the decoder unit 19 will never start the demodulation processing and the decoding processing respectively. Thus, wasteful power consumption can be avoided. In addition, the operations of the circuits at the stages subsequent to the receiver 11 (e.g., a decoding circuit to decode the TS-output) are generally designed to start after the securing of the synchronization. Accordingly, these portions can be prevented from starting their respective operations erroneously. Consequently, wasteful power consumption caused by such erroneous operations can also be avoided.

Once the antenna 12 resumes the reception of the digital broadcasting signals, timing generating unit 24 secures synchronization on the basis of the output of the guard-interval correlation detecting unit 22 and that of the frame-synchronization detecting unit 23. Accordingly, the level of the synchronization complete signal rises to the H-level, and, as FIG. 6 shows, the TS-output control unit 20 resumes outputting the TS serial data, the TS serial clock, and the TS valid data from the decoder unit 19.

As has been described thus far, in the first embodiment, the TS-output control unit is made to output the TS-output on condition that synchronization has been secured. Once synchronization has been lost, no TS-output is outputted. Accordingly, the occurrence of spurious emissions can be reduced sufficiently, so that no erroneous operations could be caused by the synchronization erroneously secured by the spurious components. Consequently, wasteful power consumption can be avoided in the receiver and in the circuits at the subsequent stages, and thus power saving can be achieved.

Note that also in the period immediately after the turning-on of the power supply, the synchronization complete signal is at the L-level and the output of the TS-output control unit 20 is held at the logic level of the initial state until the securing of synchronization. Accordingly, the outputting of the spurious emission from the TS-output control unit 20 can be avoided in all the cases other than a case where the antenna 12 receives the broadcasting signals.

In addition, in the description of the first embodiment, when no synchronization is secured, the logic level of the TS-output is held as it is. In this event, it is clear that what has to be done is to fix the logic level of the TS-output either at the L-level or at the H-level irrespective of the logic level of the TS-output at the timing when the level of the synchronization complete signal is shifted to the L-level.

(Modified Example of First Embodiment)

Figure 7:
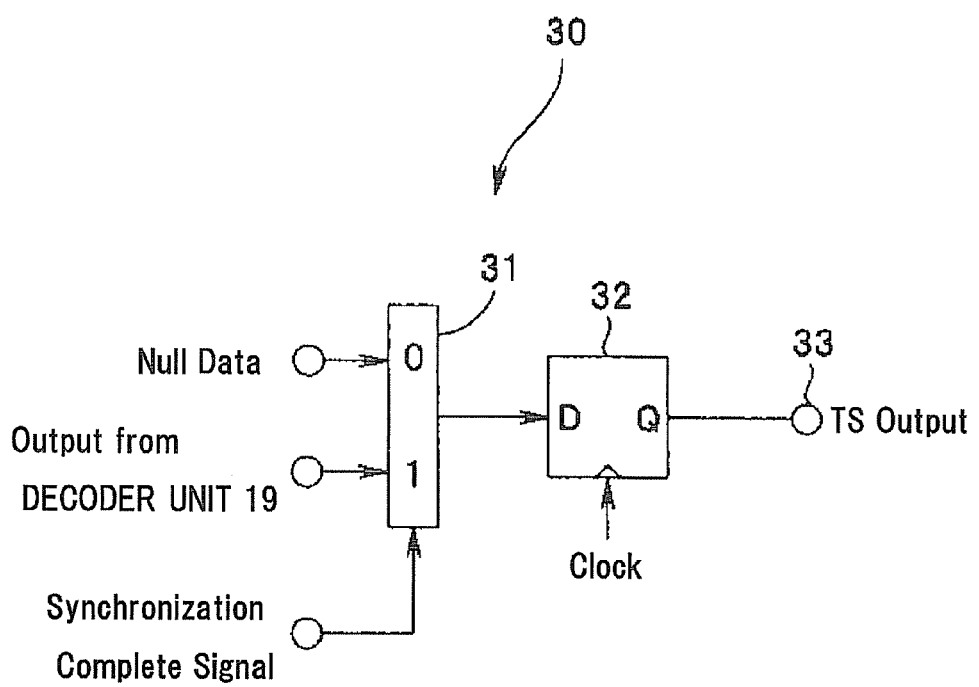
FIG. 7 is a block diagram illustrating a TS-output control unit employed in a modified example of the first embodiment of the invention.

FIG. 7 is a block diagram illustrating a TS-output control unit employed in a modified example of the first embodiment. The modified example is different from the first embodiment only in that the modified example employs a TS-output control unit 30 in place of the TS-output control unit 20 employed in the first embodiment. Note that in the modified example, only a single circuit shown in FIG. 7 has to be used.

TS-output control unit 30 includes a selector 31 and a flip-flop 32. The two input terminals of the selector 31 are supplied with the output of the decoder unit 19 (TS serial data) and null data, respectively. If the level of the synchronization complete signal supplied to the control end is at the H-level, the selector 31 selects the TS serial data. If the level of the synchronization complete signal supplied to the control end is at the L-level, the selector 31 selects the null data. Then, the selector 31 outputs the selected data to the flip-flop 32. The flip-flop 32 outputs the input of the data end as the TS-output to an output terminal 33 at the clock timings. Note that the null data employed in the modified example of the first embodiment are ones defined by MPEG2.

If the synchronization complete signal is at the H-level, the TS serial data, which are the output of the decoder unit 19, are outputted from the output terminal 33 as they are. Conversely, if the synchronization complete signal is at the L-level, the null data are outputted from the output terminal 33. Note that in the modified example, the TS-output control unit 30 outputs the TS serial clock and the TS valid data as they are outputted from the decoder unit 19.

Figure 8:
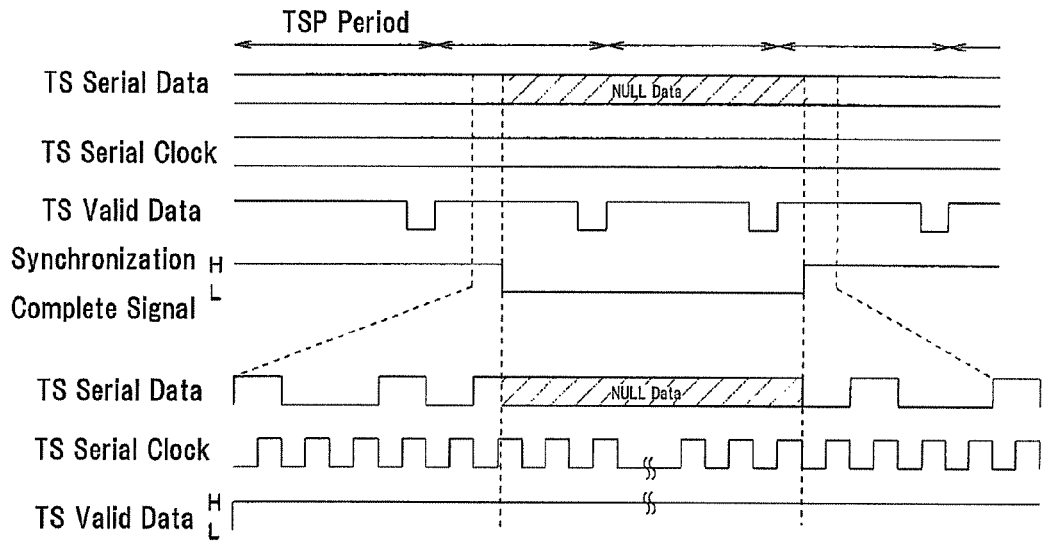
FIG. 8 is a timing chart for describing the operation of the modified example shown in FIG. 7.

Subsequently, the operation of the modified example with the above-described configuration will be described by referring to FIG. 8. FIG. 8 is a timing chart for describing the operation of the modified example. FIG. 8 corresponds to FIG. 6, and the three charts from the bottom of FIG. 8 are depicted by enlarging parts of their corresponding charts shown above in the time direction.

As FIG. 8 shows, if synchronization has been secured, the synchronization complete signal is at the H-level. Accordingly, the TS-output control unit 30 outputs the TS serial data, the TS serial clock, and the TS valid data from the decoder unit 19 as they are. Now suppose a case of losing the synchronization here. In this case, the timing generating unit 24 shifts the level of the synchronization complete signal from the H-level to the L-level. Then, the TS-output control unit 30 outputs the null data in place of the TS serial data. Meanwhile, the TS-output control unit 30 outputs the TS serial clock and the TS valid data as they are outputted from the decoder unit 19.

Some of the circuits positioned at subsequent stages and using the outputs of the receiver may sometimes operate erroneously if receive no TS-output. In view of this problem, null data are outputted in this modified example if no synchronization is secured. Accordingly, even when no synchronization is secured, the circuits at the subsequent stages can be prevented from operating erroneously.

Note that even in this case, the TS valid data and the TS serial clock are outputted as usual. This has a problem that spurious emissions may occur. Nevertheless, the null data outputted as the TS-output helps the circuits at the subsequent stages to recognize the fact that no TS-output is generated. Accordingly, when no synchronization is secured, the operations of the circuits at the subsequent stages can be reliably stopped. Consequently, a reduction in the power consumption can be accomplished in the modified example as well.

Second Embodiment

Figure 9:
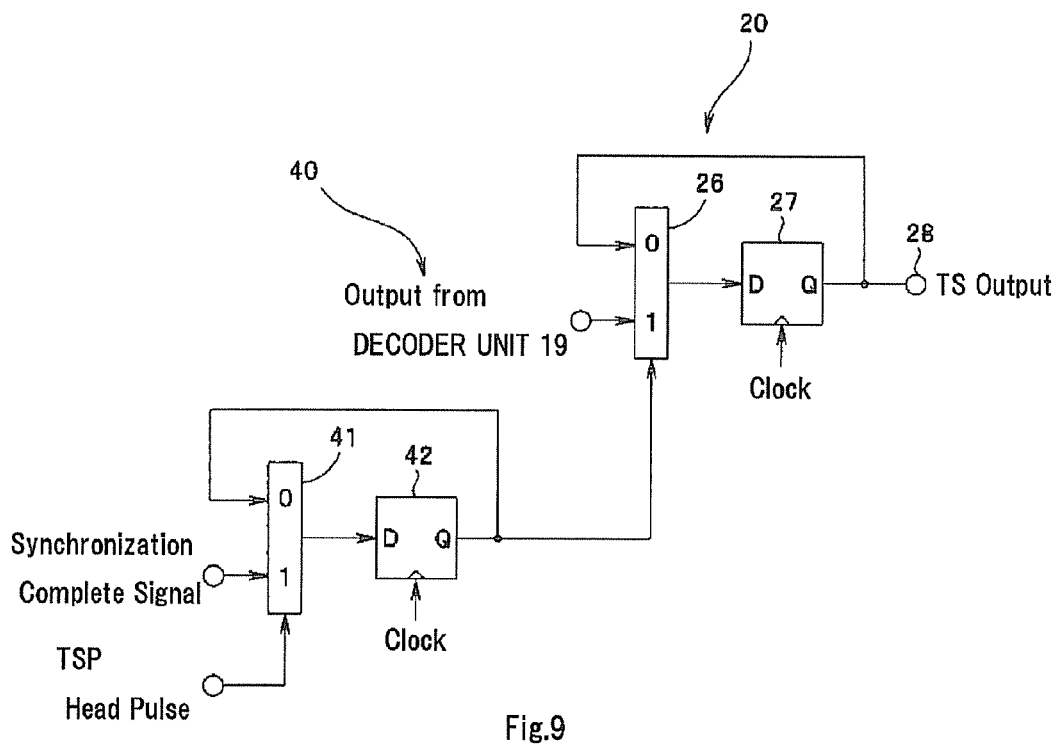
FIG. 9 is a block diagram illustrating a TS-output control unit employed in a second embodiment of the invention.

FIG. 9 is a block diagram illustrating a TS-output control unit employed in a second embodiment of the invention. In FIG. 9, the constituents identical to those in FIG. 4 are denoted by the same reference numerals as those in FIG. 4, and the redundant description will not be given here. The second embodiment is different from the first embodiment only in that the second embodiment employs a TS-output control unit 40 in place of the TS-output control unit 20 employed in the first embodiment. Note that in the second embodiment, three circuits, one of which is shown in FIG. 9, have to be prepared for the TS serial data, the TS serial clock, and the TS valid data.

The TS-output control unit 40 is formed by adding a selector 41 and a flip-flop 42 to the TS-output control unit 20. The two input terminals of the selector 41 are supplied with the synchronization complete signal and the output of the flip-flop 42, respectively. TSP head pulses are inputted into the control end of the selector 41. The TSP head pulses are supplied from the timing generating unit 24. The TSP head pulses are signals that are shifted from the L-level to the H-level, and then back to the L-level in synchronization with the timing of the TS-packet heads.

If the TSP head pulses supplied to the control end are at the H-level, the selector 41 selects the synchronization complete signal. If the TSP head pulses supplied to the control end are at the L-level, the selector 41 selects the output of the flip-flop 42. Then, the selector 41 outputs the selected one to the flip-flop 42. The flip-flop 42 outputs, as the synchronization complete signals, the input of the data end to the control end of the selector 26 at the clock timings.

Accordingly, the synchronization complete signals inputted into the selector 41 at the timing when the TSP head pulses becomes at the H-level are outputted through the flip-flop 42. In addition, in the period while the TSP head pulses are at the L-level, the logic level is maintained. Then, when the TSP head pulses become at the H-level for the next time, the change in the synchronization complete signals is transmitted to the selector 26.

Accordingly, in the second embodiment, the synchronization complete signals change in synchronization with the timings of the heads of the TSPs.

Figure 10:
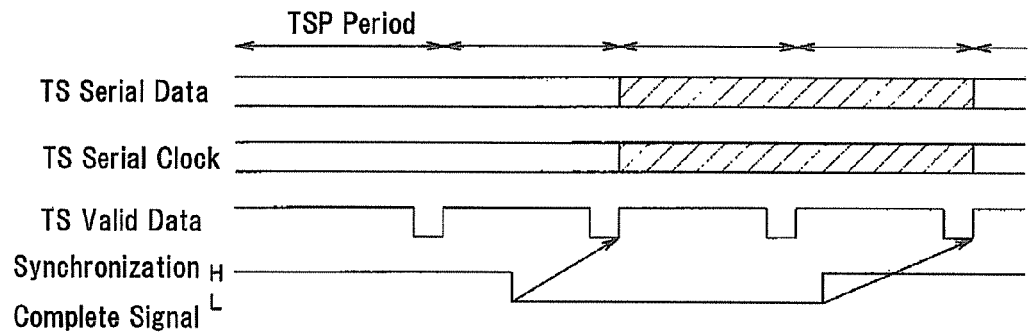
FIG. 10 is a timing chart for describing the operation of the second embodiment of the invention.

Subsequently, the operation of the second embodiment with the above-described configuration will be described by referring to FIG. 10. FIG. 10 is a timing chart for describing the operation of the second embodiment. FIG. 10 shows the TS serial data, the TS serial clock, the TS valid data, and the synchronization complete signal.

As FIG. 10 shows, if synchronization has been secured, the synchronization complete signals are at the H-level. Then, the TS-output control unit 40 outputs the TS serial data, the TS serial clock, and the TS valid data from the decoder unit 19 as they are. Now suppose that synchronization is lost here. In this case, the timing generating unit 24 shifts the level of the synchronization complete signals from the H-level to the L-level. The change in the synchronization complete signals is transmitted to the selector 26 of the TS-output control unit 40 at the timing of the head of the next TSP. Accordingly, as the diagonally-shaded portions in FIG. 10 show, the levels of the TS serial data, the TS serial clock, and the TS valid data are held at their respective logic levels immediately before the timing of the head of the TSP in synchronization with the timing. Note that for the sake of the simplicity of description, the logic level of the TS valid data are not held in FIG. 10.

Accordingly, also in the second embodiment, the outputting of unnecessary spurious components can be prevented in the period when no synchronization is secured. It is a fact that spurious components are outputted after synchronization is lost, during a period from when the level of the synchronization complete signals changes to the L-level until the timing of the head of the TSP. This period is, however, so short that no synchronization can be secured by the spurious components in this period. Accordingly, the occurrence of spurious emissions can be reliably stopped at the timing of the head of the TSP.

As has been described thus far, the same effects as those in the first embodiment can be obtained in the second embodiment as well. In addition, in the second embodiment, the switching between the ordinary TS-output and the TS-output with the fixed logic level is done in synchronization with the packet. Accordingly, the second embodiment has an additional advantage of easier control of the circuits at subsequent stages.

(Modified Example of Second Embodiment)

Figure 11:
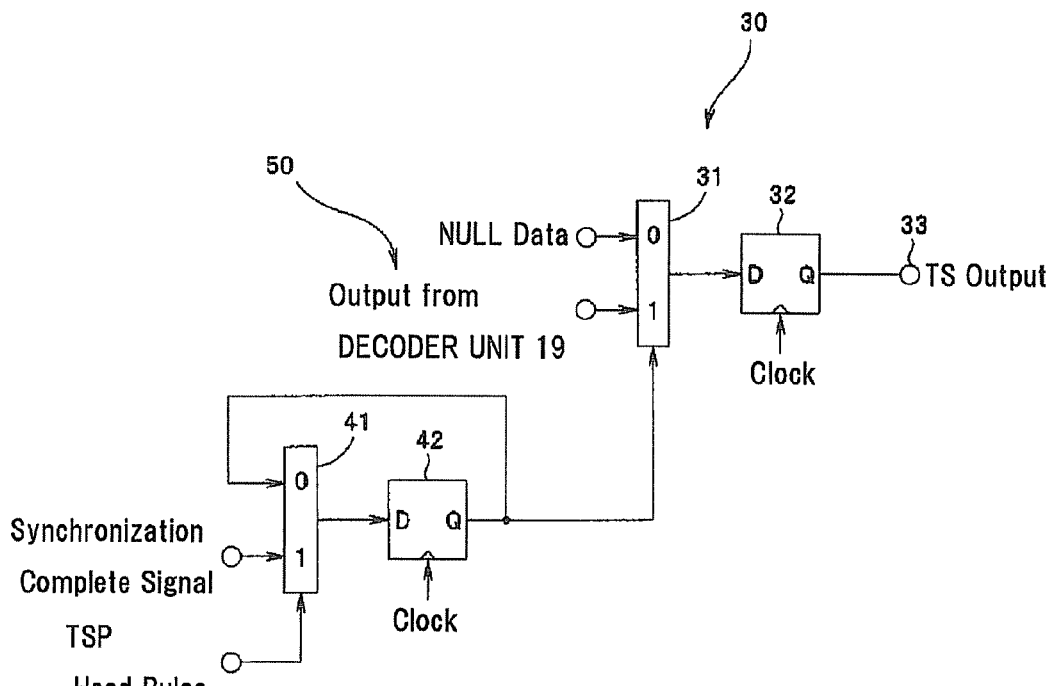
FIG. 11 is a block diagram illustrating a TS-output control unit employed in a modified example of the second embodiment of the invention.

It is clear that the above-described second embodiment is applicable to the modified example shown in FIG. 7. FIG. 11 is a block diagram illustrating a TS-output control unit employed in the modified example of the second embodiment. In FIG. 11, the constituents identical to those in FIGS. 7 and 9 are denoted by the same reference numerals as those used in FIGS. 7 and 9, and the redundant description will not be given here. The modified example of the second embodiment is different from the second embodiment only in that the modified example employs a TS-output control unit 50 in place of the TS-output control unit 40 employed in the second embodiment. Note that in the modified example of the second embodiment, only a single circuit shown in FIG. 11 has to be prepared for the TS serial data.

TS-output control unit 50 is formed by adding a selector 41 and a flip-flop 42 to the TS-output control unit 30. With this configuration, the synchronization complete signals inputted into the selector 41 at the timing when the level of the TSP head pulses changes to the H-level are outputted through the flip-flop 42. In addition, in the period when the TSP head pulses is at the L-level, the logic level is kept as it is. Then, when the level of the TSP head pulses changes to the H-level for the next time, the change in the synchronization complete signals is transferred to the selector 31.

In the modified example with the above-described configuration as well, the change in the synchronization complete signals is transferred to the selector 31 of the TS-output control unit 50 at the timing of the head of the next TSP. Accordingly, as the diagonally-shaded portions in FIG. 10 show, also in the modified example, the TS-output control unit 40 outputs the null data in place of the TS serial data in synchronization with the timing of the head of the TSP. Note that the TS serial clock and the TS valid data are outputted as usual.

Accordingly, the same effects as those obtained in the modified example shown in FIG. 7 can be obtained in this modified example as well. In addition, in this modified example, the switching between the ordinary TS-output and the null data is done in synchronization with the packet. Accordingly, this modified example has an additional advantage of easier control of the circuits at subsequent stages.

Note that in the descriptions of the embodiments, if no synchronization is secured, the TS serial data, the TS serial clock, and the TS valid data are held as they are, or only the TS serial data are made to be null data. As an example of alternative approaches, the TS serial data and the TS serial clock may be made to be null data.

In the above-described embodiments, whether synchronization has been secured or not is determined by the result of the determination as to whether both the symbol synchronization and the frame synchronization are secured or not. Alternatively, the securing of synchronization may be determined on condition that either one of the synchronizations is secured.

In the descriptions of the embodiments, the TS-output includes TS serial data, TS serial clock, and TS valid data. Alternatively, the invention can be applicable also to the cases where the TS-output includes TS parallel data, TS clock, and TS valid data.

What is claimed is:

1. A receiver comprising:
a receiving unit configured to receive digital broadcasting;
a demodulator-decoder unit configured to obtain an output including a transport stream through a demodulating processing and a decoding processing performed on a reception signal received by the receiving unit;
a synchronization detecting unit configured to secure synchronization on the basis of the reception signal received by the receiving unit, and to generate a timing signal to be used in the demodulating processing and in the decoding processing; and
an output control unit configured to output the output including the transport stream from the demodulator-decoder unit if the synchronization is secured, and to fix a logic level of the output including the transport stream if the synchronization is not secured.

2. The receiver according to claim 1, wherein
the synchronization detecting unit outputs a synchronization complete signal indicating whether the synchronization is secured or not, and
in accordance with the synchronization complete signal, the output control unit controls whether to output the output including the transport stream or to fix the logic level of the output including the transport steam.

3. The receiver according to claim 2, wherein the output control unit outputs null data in place of the transport stream if the synchronization is not secured.

4. The receiver according to claim 3, wherein
the demodulator-decoder unit outputs the output including the transport stream packet by packet, and
on the basis of whether the synchronization is secured or not, the output control unit controls, in synchronization with each of the packets, whether to output the output including the transport stream or to fix the logic level of the output including the transport stream.

5. The receiver according to claim 4, wherein
the reception signal is an OFDM signal, and
if at least one of the symbol synchronization and the frame synchronization of the OFDM signal is detected, the synchronization detecting unit determines that the synchronization is secured.

6. The receiver according to claim 3, wherein
the reception signal is an OFDM signal, and
if at least one of the symbol synchronization and the frame synchronization of the OFDM signal is detected, the synchronization detecting unit determines that the synchronization is secured.

7. The receiver according to claim 2, wherein
the demodulator-decoder unit outputs the output including the transport stream packet by packet, and
on the basis of whether the synchronization is secured or not, the output control unit controls, in synchronization with each of the packets, whether to output the output including the transport stream or to fix the logic level of the output including the transport stream.

8. The receiver according to claim 7, wherein
the reception signal is an OFDM signal, and
if at least one of the symbol synchronization and the frame synchronization of the OFDM signal is detected, the synchronization detecting unit determines that the synchronization is secured.

9. The receiver according to claim 2, wherein
the reception signal is an OFDM signal, and
if at least one of the symbol synchronization and the frame synchronization of the OFDM signal is detected, the synchronization detecting unit determines that the synchronization is secured.

10. The receiver according to claim 1, wherein the output control unit outputs null data in place of the transport stream if the synchronization is not secured.

11. The receiver according to claim 10, wherein
the demodulator-decoder unit outputs the output including the transport stream packet by packet, and
on the basis of whether the synchronization is secured or not, the output control unit controls, in synchronization with each of the packets, whether to output the output including the transport stream or to fix the logic level of the output including the transport stream.

12. The receiver according to claim 11, wherein
the reception signal is an OFDM signal, and
if at least one of the symbol synchronization and the frame synchronization of the OFDM signal is detected, the synchronization detecting unit determines that the synchronization is secured.

13. The receiver according to claim 10, wherein
the reception signal is an OFDM signal, and
if at least one of the symbol synchronization and the frame synchronization of the OFDM signal is detected, the synchronization detecting unit determines that the synchronization is secured.

14. The receiver according to claim 1, wherein
the demodulator-decoder unit outputs the output including the transport stream packet by packet, and
on the basis of whether the synchronization is secured or not, the output control unit controls, in synchronization with each of the packets, whether to output the output including the transport stream or to fix the logic level of the output including the transport stream.

15. The receiver according to claim 14, wherein
the reception signal is an OFDM signal, and
if at least one of the symbol synchronization and the frame synchronization of the OFDM signal is detected, the synchronization detecting unit determines that the synchronization is secured.

16. The receiver according to claim 1, wherein
the reception signal is an OFDM signal, and
if at least one of the symbol synchronization and the frame synchronization of the OFDM signal is detected, the synchronization detecting unit determines that the synchronization is secured.

* * * * *